United States Patent [19]

Yamamura et al.

[11] 4,436,527

[45] Mar. 13, 1984

[54] STABILIZER FOR MIXED FUELS

[75] Inventors: Masaaki Yamamura, Wakayama; Taizo Igarashi, Amagasaki; Toshiyuki Ukigai, Chiba, all of Japan

[73] Assignees: Kao Soap Co., Ltd.; Lion Corporation; Nippon Oil and Fats Co., Ltd., all of Tokyo, Japan

[21] Appl. No.: 300,855

[22] Filed: Sep. 10, 1981

[30] Foreign Application Priority Data

Sep. 16, 1980 [JP] Japan ................... 55/128087

[51] Int. Cl.³ ............................................. C10L 1/32
[52] U.S. Cl. ............................................. 44/51; 252/351
[58] Field of Search ................ 44/51; 252/351; 568/614, 620

[56] References Cited

U.S. PATENT DOCUMENTS

| | | | |
|---|---|---|---|
| 1,922,459 | 8/1933 | Schmidt | 568/614 |
| 2,552,529 | 5/1951 | De Groote | 568/620 |
| 4,069,022 | 1/1978 | Metzger | 44/51 |

*Primary Examiner*—Charles F. Warren
*Assistant Examiner*—Y. Harris-Smith
*Attorney, Agent, or Firm*—Flynn, Thiel, Boutell & Tanis

[57] ABSTRACT

A stabilizer for mixed fuels containing a reaction product obtained by reacting (1) a polyol having at least 3 hydroxyl groups in the molecule and a molecular weight of 400–10,000 with (2) an epihalohydrin, as the principal component.

10 Claims, No Drawings

STABILIZER FOR MIXED FUELS

The present invention relates to a stabilizer for mixed fuels. More particularly, the present invention relates to a stabilizer for mixed fuels which is used as a dispersion stabilizer in dispersing fine coal particles in fuel oil.

Investigations on mixed fuels comprising coal and a fuel oil, such as heavy oil or crude oil, were made for military purposes or other purposes during the First World War and the Second World War. However, practical utilization of the results of those investigations was discontinued after a stable petroleum supply had been attained because those investigations were made mainly for the purpose of making up for a deficiency in the petroleum supply. Thereafter, investigations were again made on coal-containing liquid fuels based on the idea that handling costs might be reduced, since transportation of coal requires considerable labor in the shipping and discharging of coal, and for conveyance of coal after discharging. In France and the U.S.A., aqueous slurry transportation has been realized in which fine coal particles are transported by hydraulic transportation through pipelines. Although hydraulic transportation of aqueous coal slurries was also discussed in Japan, this means was not employed in practice because marine transportation is predominantly employed, the cost of such hydraulic transportation is increased due to the water in the aqueous slurry, and, in addition, the combustion efficiency is reduced disadvantageously. The idea of using a petroleum fuel in place of water to overcome said defects has been reported. Under these circumstances, the use of the above-mentioned mixed fuel comprising coal and a fuel oil such as heavy oil and crude oil, i.e., COM (Coal/Oil Mixture), is now being reconsidered. Currently, the practical utilization of COM is being studied for the purpose of reducing costs by using COM in place of the heavy oil, which has increased in price remarkably in recent years, and also for the purpose of increasing utilization of coal, which is an abundant resource. In Japan, coal is imported from foreign countries and, therefore, the reduction in handling costs will cause a reduction in the prices of products. The practical utilization of COM is now eagerly demanded. COM has the following advantages:

(i) COM has a calorific value higher than that of coal. It can be combusted in an existing petroleum combustion device after a partial remodeling thereof.

(ii) Marine transportation of COM by means of a tanker is possible. The transportation of coal on a mass scale is made possible.

(iii) Long distance overland tranportation (pipeline transportation) is possible.

(iv) Spontaneous ignition of coal during transportation can be prevented. Thus, importation of brown coal, which could not be imported previously because it is subject to spontaneous ignition, is made possible.

(v) Storage areas may be small. COM has a specific gravity higher than that of water and, therefore, COM fires can be easily extinguished. Unlike crude oil, COM is not subject to accidental spillage.

(vi) A stable supply of COM is assured. Use of COM is economically advantageous.

(vii) COM can be handled like petroleum during transportation, as compared to the marine transportation of coal, for which a large recipient harbor quay and a great mechanical equipment investment for landing and conveyance of the coal are necessary.

The solid coal particles become sedimented or settle in the fuel oil (dispersion medium) due to the difference in the specific gravities of coal particles and fuel oil. As the coal particles become smaller, the sedimentation velocity becomes lower. It is desirable, therefore, to divide the coal into particles which are as fine as possible. However, on the other hand, pulverization costs are increased as the particle size is reduced. Pulverized coal particles now used in thermoelectric power plants have particle sizes such that 80% of the particles pass through a 200 mesh sieve, i.e., they have a particle size less than about 74 microns. Pulverized coal of this particle size would be employed as a measure of the particle size of the powdered coal. If a surfactant is added to COM as a stabilizer, the surfactant is adsorbed on the surface of the coal particles at the interfaces between the particles and the fuel oil, whereby the coal particles are separated from one another and coagulation or agglomeration of the particles is prevented. In COM, it is required that the dispersion stabilizer (surfactant) promotes the formation of a soft precipitate of the coal particles sedimented in the lower layer. If COM is stirred after storage for a long period of time, it is required that a homogeneous COM can be formed again easily. For this purpose, the coal particles should form a soft precipitate which can easily be dispersed again. After COM is prepared, it is passed through many processes, such as pipeline transportation, tanker transportation and storage in a tank before it is combusted. It is particularly necessary, therefore, that the coal particles in COM have a low sedimentation velocity and that they are easily dispersed again in the dispersion medium. If COM is allowed to stand after preparation, substantially whole coal particles are sedimented generally after 1 or 2 days in the absence of the stabilizer, although the period varies depending on the specific combination of coal and fuel oil that is used. The precipitate thus formed is very hard and the redispersibility thereof is quite poor. Therefore, if COM is to be stored for a long period of time after preparation, a stabilizer is important and excellent stabilizers are thus demanded. The period during which COM can be successfully stored after preparation thereof should be at least 4-7 days, and preferably should be at least 15-30 days, since COM is passed through the above-described transportation processes. Further, redispersibility after storage is required.

As stabilizers for COM, numerous patent applications for such stabilizers have been filed by Petrolite Corporation. Although the utility of many commercially available surfactants is disclosed in those patents, the stabilizing effects of those surfactants are still insufficient. In view of the circumstances as described above, development of better stabilizers has been eagerly demanded.

The coal particles in COM become sedimented during storage for a long period of time because they have relatively large particle sizes as described above. A process for retarding the sedimentation velocity is disclosed in a patent of Petrolite Corporation wherein an additive is incorporated into COM to increase the viscosity thereof, and particularly to attain a thixotropic system. However, this process also has the defects that part of the coal particles become sedimented to form a hard precipitate, the degree of the thixotropy is limited, the increased viscosity causes practical problems in handling, and the value of the COM is seriously impaired.

Recently, numerous stabilizers for mixed fuels comprising coal powder and a fuel oil have been proposed for solving those problems. However, dispersion stabilizers for COM having a sufficient dynamic stability and static stability have not been found.

After intensive investigations made for the purpose of overcoming the defects of conventional stabilizers for COM, the inventors have discovered the present invention. The present invention provides a stabilizer for mixed fuels containing, as the principal component, a reaction product obtained by reacting a polyol having at least 3 hydroxyl groups and a molecular weight of 400–10,000 with an epihalohydrin.

The polyols having at least 3 hydroxyl groups in the molecule and a molecular weight of 400–10,000, used in the present invention, can be either synthetic or natural. For example, there can be mentioned synthetic compounds of high molecular weight, such as partially saponified polyvinyl acetate, partially or wholly saponified polyvinyl alcohol, and polyvinyl acetate copolymers, as well as natural compounds of high molecular weight, such as cellulose and starch. The polyols further include adducts of polyhydric alcohols having at least 3 hydroxyl groups in the molecule, such as glycerol, propanetriol, pentaerythritol, sorbitan and sorbitol, with alkylene oxides such as ethylene oxide and propylene oxide; and adducts of compounds having at least 3 active hydrogen atoms in the molecule, such as ethylenediamine, diethylenetriamine and N-alkyl-alkylenediamines, with alkylene oxides such as ethylene oxide and propylene oxide. The polyols also include compounds comprising at least three nuclei and having an aromatic hydroxyl group, such as condensates of phenol or alkyl-substituted phenols, with formaldehyde, and alkylene oxide adducts of those compounds.

The starting polyol having at least 3 hydroxyl groups in the molecule should have a molecular weight of 400–10,000, preferably 600–8,000. If the molecular weight is less than 400, the bulking power is poor and the effect of preventing flocculation of the coal particles due to steric repulsion is also poor. On the other hand, a molecular weight of more than 10,000 is disadvantageous in the handling of the product.

The epihalohydrins used in the present invention are epichlorohydrin and epibromohydrin. Epichlorohydrin is preferred.

The amount of the epihalohydrin used is at least 3 moles per mole of the polyol having at least 3 hydroxyl groups in the molecule. It is preferred that the epihalohydrin be used in an amount equimolar to the hydroxyl groups in the polyol.

The reaction of the polyol having at least 3 hydroxyl groups in the molecule and a molecular weight of 400–10,000, with the epihalohydrin, proceeds smoothly in the absence of catalyst or in the presence of an alkali or a metal catalyst, such as tin.

The reaction product is a halohydrin compound or a compound having a terminal epoxy group, or a mixture of such compounds.

The reaction product is considered to have a three-dimensional bulking power due to the hydroxyl groups, of which there are at least three, in the polyol used as the starting material. Also, it is thought that the adsorption of the reaction product on the coal particles or binding of the product with the particles is accelerated by the terminal reactive group, such as the halohydrin group or epoxy group, and a high degree of prevention of sedimentation of the coal particles is thereby obtained.

Generally, a compound having a terminal epoxy group can also be obtained by reacting a compound having at least 2 epoxy groups, such as a diepoxide, with an alcohol or an amine. However, in the case of a polyol having at least 3 hydroxyl groups in the molecule, as is employed in the present invention, a cross-linking reaction also proceeds to form a gelated product. Thus, this type of reaction cannot be employed.

Compounds obtained by cross-linking polyhydric alcohols with diepoxy compounds are disclosed in the specification of Japanese Patent Laid-Open No. 53106/1979. However, according to our experiments wherein a diepoxy compound was used in an amount of ⅔ equivalent per equivalent of the hydroxyl groups in a polyhydric alcohol, gelation was caused and a satisfactory product could not be obtained. By contrast, according to the process of the present invention wherein a polyol is reacted with the epihalohydrin, the reaction proceeds smoothly without causing gelation even if 1.0 equivalent of the epihalohydrin is used per one equivalent of the polyol in the reaction. The increase in the molecular weight of the resulting product was due only to the addition of the epihalohydrin. The products of the present invention have a high COM-stabilizing effect, as will be shown in the examples given below.

A reason why the cross-linking reaction does not proceed and an excellent stabilizer is formed is that the reaction velocity of the reaction product of the present invention with the hydroxyl groups is far lower than that of the epihalohydrin with the hydroxyl groups. For this reason, the amount of the epihalohydrin is preferably stoichiometrically equimolar to the hydroxyl groups.

As to the mechanism of the effects of the dispersion stabilizer in COM, it is considered that the stabilizer is adsorbed on the coal particle surfaces to form a chain flocculation structure in COM and that an electric double layer is formed at the interface between the coal and the oil or water contained in COM, and that this prevents the flocculation of the coal particles. It is also considered that the stabilization effect of the present invention is exhibited because the terminal epoxy group or halohydrin group of the stabilizer is chemically bonded to an -OH group or -SH group of the coal (chemical adsorption).

Various coals are used for the preparation of COM. They can be classified into anthracite, bituminous coal, sub-bituminous coal, brown coal, etc., according to the degree of coalification. The ranking of coalification descends in that order, anthracite coal having the highest rank and brown coal having the lowest. Gradually, the number of functional groups found in the coal, such as hydroxyl groups and carboxyl groups, increases in the above-mentioned order. The stabilizer of the present invention is effective for all the types of coal listed above, particularly for sub-bituminous coal and brown coal.

If the stabilizer of the present invention is added to COM in an amount of 0.01–1.0 wt. %, preferably 0.05–0.5 wt. %, based on the weight of the COM, the coal particles can be dispersed stably in the fuel oil and any sedimented coal particles that form a lower layer or precipitate can be easily dispersed again. In a dispersion of fine solid particles in a dispersion medium, in the presence of a dispersant, the precipitate formed by the sedimentation and accumulation of the particles during storage for a long period of time becomes harder as the stabilizing effect is increased. It is required with COM that there can be formed only a soft precipitate which can easily be dispersed again. The stabilizer of the present invention is characterized by the feature that it forms a soft precipitate which can easily be dispersed again in accordance with the above requirement.

If the mixing ratio of coal (C) to fuel oil (O), i.e., the C/O (weight ratio), is extremely low, COM preparation is not worthwhile. If C/O is extremely high, the viscosity becomes excessive. The C/O (weight ratio), which can vary depending on the particular combination of coal and fuel oil employed, is generally in the range of 20/80–70/30, preferably 40/60–55/45, parts by weight. From the viewpoint of transportation efficiency, the water content of the COM should be minimized. However, from the viewpoint of stability or redispersibility, some appreciable water content of COM is recommended. Generally, the water content of coal is from 1–6 wt. % in many cases. Some coals have a water content of approximately 20–40 wt. %. If the coal has such a high water content, it is preferred to reduce the water content to at most 15% by prior heating or the like. It is more preferable to reduce the water content to several percent or less before it is used for the preparation of COM. When the coal naturally contains about 1–6 wt. % of water, the water may be removed beforehand or the coal may be used as is.

As to the mixing order of the coal, the stabilizer and the fuel oil, there can be employed the following methods. The stabilizer can be added to the fuel oil to obtain a solution. Then the coal is added to the solution and COM is prepared by means of a suitable mixing device or pulverization device. However, COM of greater stability can be obtained by adding the coal to the fuel oil, preparing COM by means of a suitable mixing device or pulverization device, and then mixing the COM-oil mixture with the stabilizer in a suitable mixing device. Any mixing device or pulverization device can be used if it exhibits a high effect.

The term "fuel oil" used herein means all liquid fuel oils, such as heavy oil and crude oil.

The following examples further illustrate the present invention but the present invention is not limited to the subject matter of the examples.

EXAMPLE 1

Synthesis of Stabilizer 30 g of glycerol/PO (propylene oxide) adduct (molecular weight: 3000) and 0.26 g of stannic chloride were dissolved in 100 ml of toluene. A solution of 3.7 g of epichlorohydrin in 20 ml of toluene was added dropwise thereto at a temperature maintained at 70°–80° C. The reaction was carried out for two hours.

After completion of the reaction, the reaction product was subjected to filtration. Toluene and unreacted epichlorohydrin were removed from the topping to obtain a mixture of an epoxy compound and a halohydrin having an oxirane value of 41 and a hydroxyl value of 26.6.

COM Preparation 231.2 g (excluding water contained in the oil) of a Middle East heavy oil*[1] were placed in a 500 ml vessel. A given amount of each of the stabilizers shown in Table 1 was added thereto (in separate preparations), and the entirety thereof was immersed in an oil bath at 70° C. 250 g (excluding the water contained in the coal) of Beluga coal*[2], pulverized into a particle size such that 80% thereof passed through a 200 mesh sieve and having a water content controlled to 7 wt. %, was added to the above Middle East heavy oil. Since the Middle East heavy oil contained 0.03 wt. % of water and the Beluga coal contained 7.0 wt. % of water, the weight ratio of coal (dry)/(Middle East heavy oil+water) was 50/50. Namely, the sum of water contained in the oil and the coal was 18.9 g. The vessel containing the stabilizer-containing oil and coal was immersed in an oil bath at 70° C. for one hour, whereby the contents of the vessel were held at a constant temperature. The mixture of the coal and oil maintained at the constant temperature was stirred by means of a laboratory mixer (a product of Tokushu Kikako Co.) at 3,000 rpm for 30 minutes to prepare COM, which was then subjected to the stability test.

*[1]: Middle East heavy oil (produced in the Middle East): Calorific value: 10310 Kcal/kg (JIS K2265) Specific gravity: 0.9576 Pour point: −2.5° C. (JIS K2269) Flash point: 94.0° C. (JIS K2265) Ash content: 0.02% (JIS K2272) Water content: 0.03% (JIS K2275) Elementary analysis (Yanagimoto Organic automatic element analysis device): C:84.17%, H:13.06%, S:2.39%, N:0.25%, O:0.13%, Cl:3.3 ppm, V:65 ppm, Na:15 ppm
*[2]: Beluga coal (produced in Alaska) Calorific value: 6180 Kcal/kg (JIS M8814) Ash content: 10.5% (JIS M8812) Water content: 23.5% (JIS M8811) Fixed carbon content: 42.0% (JIS M8812) Elementary analysis (JIS M8813): C:69.1%, H:5.5%, O:24.6%, N:0.8%, S:0.19%.

Standing Stability Test

As a test device, there was used a stainless steel cylinder having an inner diameter of 5.5 cm and a height of 24 cm, and having ports each provided with a stopper at positions spaced 6 cm, 12 cm and 18 cm from the bottom of the cylinder. Each COM prepared as described above was charged to a depth of 18 cm in the cylinder and the contents were allowed to stand in a constant temperature bath at 70° C. for 30 days. After 30 days, the stopper 12 cm distant from the bottom was taken out to remove the fraction of the COM above this line (i.e., the COM fraction in 12–18 cm zone from the bottom of the cylinder). The coal concentration in the thus-obtained top layer sample was measured. Then, the stopper 6 cm from the bottom of the cylinder was taken out to remove a sample of the COM positioned above this stopper. The coal concentration in the thus-obtained middle layer sample (6–12 cm zone) was measured. Finally, the remaining COM (bottom layer sample) was taken out and the coal concentration thereof was measured. The coal concentration was determined as follows: 1,1,1-Trichloroethane was added to COM to dissolve the heavy oil fraction therein. The heavy oil fraction was removed by filtration. The ratio (wt. %) of the amount of coal remaining as filtration residue to the original amount thereof was determined. The results are shown in Table 1. The smaller the difference in coal concentration in the respective layers, the higher is the stability of the COM.

TABLE 1

| Compound having at least | Stabilizer Number of hydroxyl groups in | Molecular | Epihalohydrin |

TABLE 1-continued

| | 3 hydroxyl groups | the molecule | weight | Halogen[1] | Rate[2] |
|---|---|---|---|---|---|
| Comparative Examples | | | | | |
| 1 | None | — | — | — | 0 |
| 2 | Glycerol/PO adduct | 3 | 3000 | — | 0 |
| 3 | Pentaerythritol/PO adduct | 4 | 600 | — | 0 |
| 4 | Pentaerythritol/PO.EO adduct[3] (EO 50 wt. %) | 4 | 1000 | — | 0 |
| 5 | Pentaerythritol/PO.EO adduct[3] (EO 50 wt. %) | 4 | 6000 | — | 0 |
| 6 | Pentaerythritol/EO adduct | 4 | 800 | — | 0 |
| Present Invention | | | | | |
| 7 | Glycerol/PO adduct | 3 | 3000 | chlorine | 1.0 |
| 8 | Glycerol/PO adduct | 3 | 3000 | bromine | 1.0 |
| 9 | Pentaerythritol/PO adduct | 4 | 600 | chlorine | 1.0 |
| 10 | Pentaerythritol/PO adduct | 4 | 3000 | chlorine | 1.0 |
| 11 | Pentaerythritol/PO.EO adduct (EO 20 wt. %) | 4 | 800 | chlorine | 1.0 |
| 12 | Pentaerythritol/PO.EO adduct (EO 20 wt. %) | 4 | 800 | chlorine | 0.75 |
| 13 | Pentaerythritol/PO.EO adduct (EO 20 wt. %) | 4 | 800 | bromine | 1.0 |
| 14 | Pentaerythritol/PO.EO adduct (EO 20 wt. %) | 4 | 3000 | bromine | 1.0 |
| 15 | Pentaerythritol/PO.EO adduct (EO 50 wt. %) | 4 | 900 | chlorine | 1.0 |
| 16 | Pentaerythritol/PO.EO adduct (EO 50 wt. %) | 4 | 6000 | chlorine | 1.0 |
| 17 | Pentaerythritol/PO.EO adduct (EO 50 wt. %) | 4 | 3000 | chlorine | 1.0 |
| 18 | Pentaerythritol/PO.EO adduct (EO 50 wt. %) | 4 | 3000 | bromine | 1.0 |
| 19 | Pentaerythritol/PO.EO adduct (EO 70 wt. %) | 4 | 1600 | chlorine | 1.0 |
| 20 | Pentaerythritol/EO adduct | 4 | 2500 | chlorine | 1.0 |
| 21 | Sorbital/PO adduct | 6 | 3000 | chlorine | 1.0 |
| 22 | Sorbitol/PO adduct | 6 | 3000 | chlorine | 0.5 |
| 23 | Sorbitol/PO.EO adduct (EO 20 wt. %) | 6 | 900 | chlorine | 1.0 |
| 24 | Sorbitol/PO.EO adduct (EO 20 wt. %) | 6 | 900 | chlorine | 0.8 |
| 25 | Sorbitol/PO.EO adduct (EO 20 wt. %) | 6 | 3200 | chlorine | 1.0 |
| 26 | Sorbitol/PO.EO adduct (EO 20 wt. %) | 6 | 3200 | chlorine | 0.5 |
| 27 | Sorbitol/PO.EO adduct (EO 20 wt. %) | 6 | 3200 | bromine | 1.0 |
| 28 | Sorbitol/PO.EO adduct (EO 50 wt. %) | 6 | 800 | chlorine | 1.0 |
| 29 | Sorbitol/PO.EO adduct (EO 50 wt. %) | 6 | 800 | chlorine | 0.5 |
| 30 | Sorbitol/PO.EO adduct (EO 50 wt. %) | 6 | 5800 | chlorine | 1.0 |
| 31 | Diethanolamine/PO adduct | 3 | 4500 | chlorine | 1.0 |

| | Amount of stabilizer (based on COM) wt. % | Stability (coal concentration) | | |
|---|---|---|---|---|
| | | Top layer | Middle layer | Bottom layer |
| Comparative Examples | | | | |
| 1 | 0 | 17.1 | 54.0 | 63.3 |
| 2 | 0.2 | 19.7 | 53.0 | 60.9 |
| 3 | 0.2 | 20.6 | 53.1 | 60.7 |
| 4 | 0.2 | 20.4 | 52.9 | 61.1 |
| 5 | 0.2 | 21.0 | 52.7 | 62.3 |
| 6 | 0.2 | 20.3 | 53.2 | 61.4 |
| Present Invention | | | | |
| 7 | 0.2 | 43.0 | 50.8 | 55.0 |
| 8 | 0.2 | 42.9 | 50.5 | 55.2 |
| 9 | 0.2 | 45.1 | 50.3 | 53.7 |
| 10 | 0.2 | 46.0 | 50.7 | 53.5 |
| 11 | 0.2 | 47.1 | 50.2 | 51.5 |
| 12 | 0.2 | 43.1 | 50.6 | 55.7 |
| 13 | 0.2 | 46.9 | 50.1 | 52.1 |
| 14 | 0.2 | 47.7 | 50.0 | 51.7 |
| 15 | 0.2 | 47.9 | 50.1 | 52.0 |
| 16 | 0.2 | 48.8 | 50.1 | 50.9 |
| 17 | 0.2 | 48.0 | 50.3 | 51.5 |
| 18 | 0.2 | 47.9 | 49.8 | 52.0 |
| 19 | 0.2 | 47.2 | 49.9 | 52.3 |
| 20 | 0.2 | 45.1 | 50.4 | 53.0 |
| 21 | 0.2 | 45.7 | 50.3 | 53.1 |
| 22 | 0.2 | 42.8 | 51.2 | 55.8 |

TABLE 1-continued

| | | | | |
|---|---|---|---|---|
| 23 | 0.2 | 47.2 | 50.3 | 51.0 |
| 24 | 0.2 | 47.0 | 50.1 | 51.4 |
| 25 | 0.2 | 47.5 | 50.8 | 52.0 |
| 26 | 0.2 | 43.1 | 49.9 | 55.4 |
| 27 | 0.2 | 47.0 | 49.6 | 51.4 |
| 28 | 0.2 | 47.4 | 50.1 | 51.8 |
| 29 | 0.2 | 42.7 | 49.6 | 56.0 |
| 30 | 0.2 | 47.7 | 50.7 | 51.1 |
| 31 | 0.2 | 43.1 | 51.0 | 55.3 |

Note
(1) Chlorine and bromine indicate epichlorohydrin and epibromohydrin, respectively.
(2) Epihalohydrin/hydroxyl ratio (molar ratio).
(3) wt. % of polyoxyethylene group based on the whole molecule.
(4) PO means propylene oxide
EO means ethylene oxide The embodiments of the invention in which an exclusive property or privilege is claimed are defined as follows:

1. A mixed fuel composition which comprises a dispersion of pulverized coal dispersed in fuel oil, said dispersion containing an effective stabilizing amount of the reaction product obtained by reacting (1) polyol having at least 3 hydroxyl groups in the molecule and having a molecular weight of from 400 to 10,000, with (2) an epihalohydrin.

2. A mixed fuel composition as claimed in claim 4 in which said dispersion contains from 0.01 to 1.0 wt. % of said reaction product, based on the weight of said dispersion.

3. A mixed fuel composition as claimed in claim 1 in which said dispersion contains from 0.05 to 0.5 wt. % of said reaction product, based on the weight of said dispersion.

4. A mixed fuel composition as claimed in claim 5 or claim 3, in which the weight ratio of coal/fuel oil in said dispersion is in the range of 20/80 to 70/30.

5. A mixed fuel composition as claimed in claim 2 or claim 3, in which the weight ratio of coal/fuel oil in said dispersion is in the range of 40/60 to 55/45.

6. A mixed fuel composition as claimed in claim 1 in which at least 80% of the pulverized coal has a particle size of less than 74 microns.

7. A mixed fuel composition as claimed in claim 4, in which said dispersion contains up to 15 wt.% of water.

8. A mixed fuel composition as claimed in claim 4, in which said dispersion contains from 1 to 6 wt.% of water.

9. A mixed fuel composition as claimed in claim 4, in which the molar ratio of epihalohydrin/hydroxyl groups in said polyol is from 0.5 to 1.0.

10. A mixed fuel composition consisting essentially of a dispersion of pulverized coal dispersed in fuel oil wherein the weight ratio of coal/fuel oil is in the range of 20/80 to 70/30, said dispersion containing up to 15 wt.% of water and from 0.01 to 1.0 wt.% of a stabilizer which is the reaction product obtained by reacting (1) a polyol having at least 3 hydroxyl groups in the molecule and having a molecular weight of from 400 to 10,000, and (2) an epihalohydrin, the amount of said epihalohydrin being substantially equimolar to the hydroxyl groups in said polyol.

* * * * *

UNITED STATES PATENT AND TRADEMARK OFFICE
CERTIFICATE OF CORRECTION

PATENT NO. : 4 436 527

DATED : March 13, 1984

INVENTOR(S) : Masaaki Yamamura et al

It is certified that error appears in the above-identified patent and that said Letters Patent is hereby corrected as shown below:

Column 9, line 31; change "claim 4" to ---claim 1---.

Column 9, lines 39 and 40; change "claim 5 or claim 3" to ---claim 2 or claim 3---.

Column 10, line 22; change "claim 4" to ---claim 1---.

Column 10, line 24; change "claim 4" to ---claim 1---.

Column 10, line 27; change "claim 4" to ---claim 1---.

Signed and Sealed this

Thirty-first Day of July 1984

[SEAL]

Attest:

GERALD J. MOSSINGHOFF

Attesting Officer

Commissioner of Patents and Trademarks